UNITED STATES PATENT OFFICE.

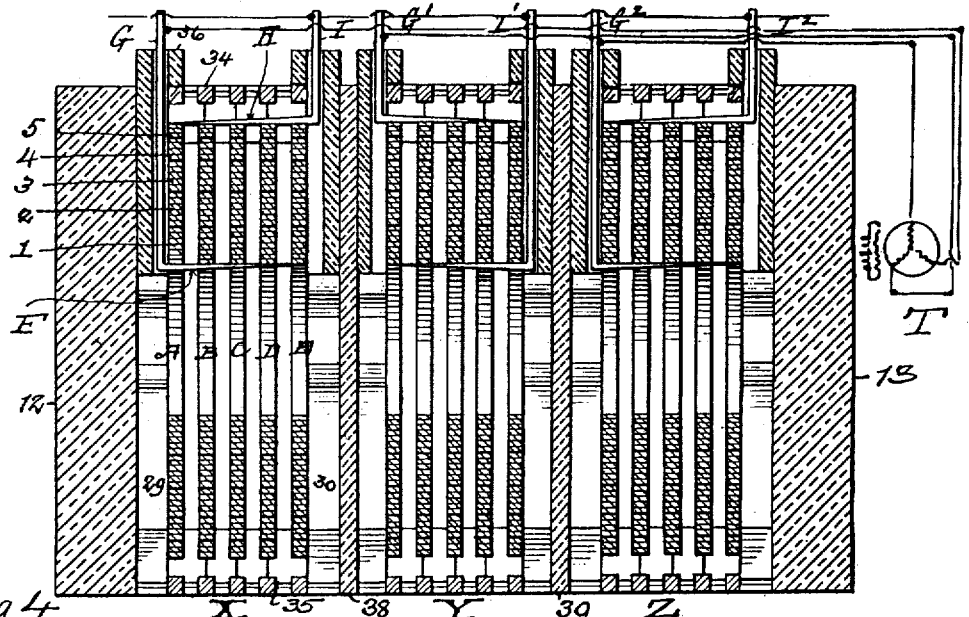
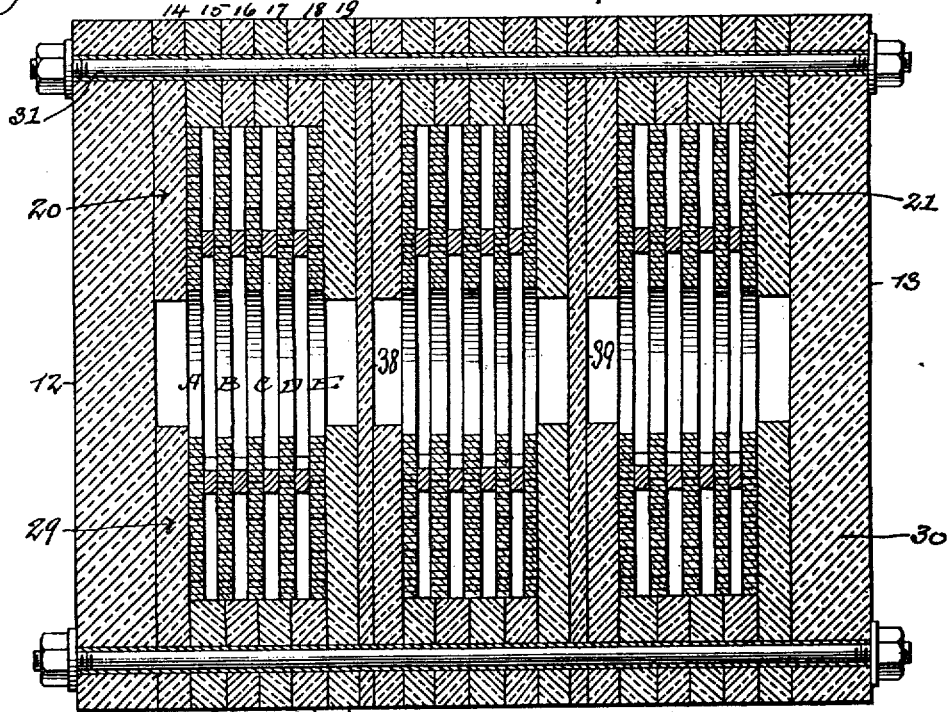
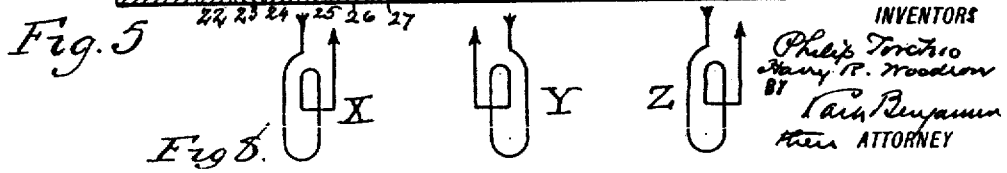

PHILIP TORCHIO AND HARRY R. WOODROW, OF NEW YORK, N. Y., ASSIGNORS TO THOMAS E. MURRAY, OF NEW YORK, N. Y.

POLYPHASE REACTANCE-COIL.

1,242,497.  Specification of Letters Patent.  Patented Oct. 9, 1917.

Application filed March 15, 1917. Serial No. 155,065.

*To all whom it may concern:*

Be it known that we, PHILIP TORCHIO and HARRY R. WOODROW, citizens of the United States, residing at New York, in the county of New York and State of New York, have invented a certain new and useful Improvement in Polyphase Reactance-Coils, of which the following is a specification.

The invention is a polyphase reactance coil for high tension voltage. Such coils may be used in series with high speed alternating current generators to limit the instantaneous inrush of current under short circuit conditions, thus relieving the generator winding from abnormal stresses, and facilitating the parallel operation of other generators and synchronous apparatus in the system.

The invention consists, first, in the construction whereby a plurality of sets of coils of the "pancake" type—the coils of each set being connected in multiple—are respectively connected to currents of different phase; and second, in the construction of the casing wherein said sets of coils are supported and inclosed—all as more particularly hereinafter set forth.

In the accompanying drawings—

Figure 1:
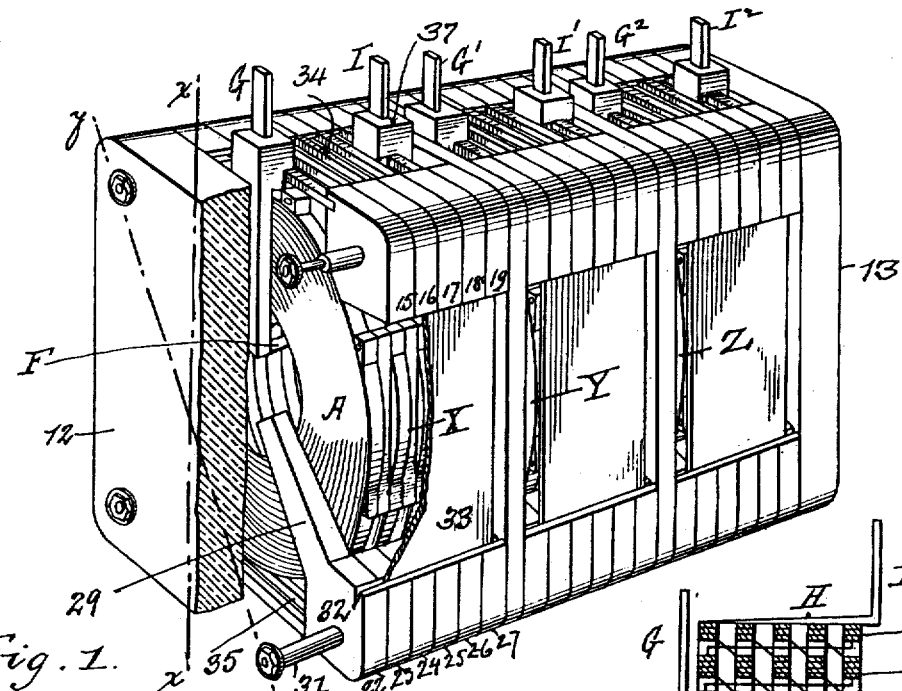
Figure 2:
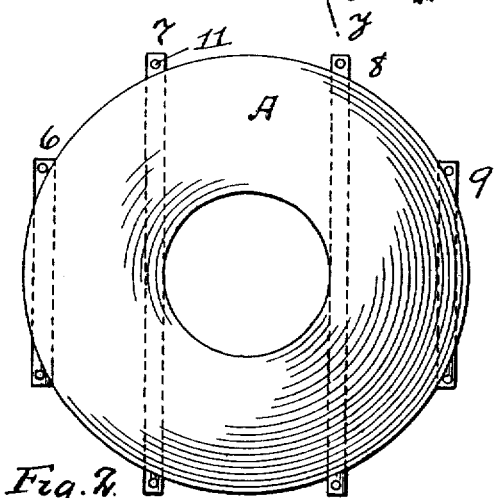
Figure 3:
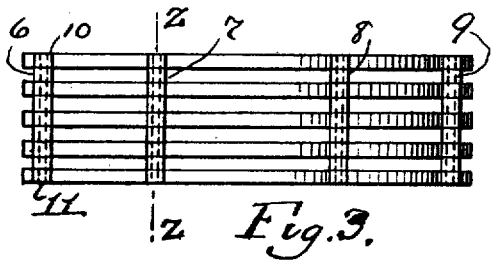
Figure 6:
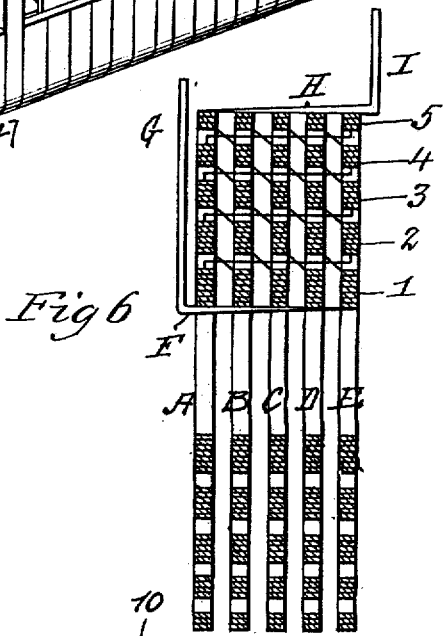
Figure 7:
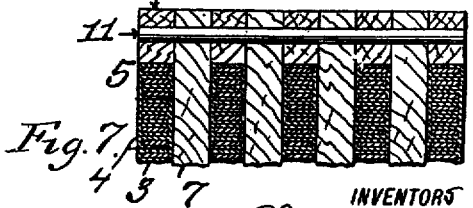

Figure 1 is a perspective view of our reactance coils, with portions broken away to show the internal construction. Fig. 2 is a face view of one of the coils, showing also the vertical spacing bars in dotted lines. Fig. 3 is a top view of the coils, showing the spacing bars in place. Fig. 4 is a vertical section on the line $x$, $x$ of Fig. 1. Fig. 5 is a diagonal section on the line $y$, $y$ of Fig. 1. Fig. 6 shows the coils in vertical section, with the windings somewhat separated to exhibit the winding connections. Fig. 7 is an enlarged vertical section of the top portion of the coils and spacing bars on the line $z$, $z$ of Fig. 3. Fig. 8 shows diagrammatically the direction of winding in the sets of coils.

Similar numbers and letters of reference indicate like parts.

Our apparatus comprises three sets, X, Y, Z, of coils. As the coils of each set are like the coils of the other sets, a description of the coils of one set will apply to all.

Referring first to Fig. 6: A, B, C, D, E represent five coils of one of the sets, as X. Said coils are of the so-called "pancake" type, formed of flat strips of conducting material covered with insulation. Each coil has five windings, 1, 2, 3, 4, 5. The innermost winding 1, which is nearest the center of the coil, is here shown with seven turns; the winding 2 with six turns; the winding 3 with five turns; the winding 4 with four turns and the outermost winding 5 with three turns.

The connections between the windings are such that the windings 1, 2, 3, 4, of coils B, C, D, E are each connected to the winding next outside and to the left. Thus winding 1 of coil E is connected to winding 2 of coil D; winding 2 of coil D to winding 3 of coil C; winding 3 of coil C to winding 4 of coil B, and winding 4 of coil B to winding 5 of coil A. The windings 1, 2, 3, 4 of coil A are connected respectively to windings 2, 3, 4, 5 of coil E. The unconnected terminals of windings 1 of coils A, B, C, D, E are all connected to the bent over end portion F of a metal lead G and the unconnected terminals of windings 5 of said coils are all connected to the bent over end portion H of a metal lead I. The several coils A, B, C, D, E are thus connected in multiple with the leads G, I. There are as many "pancake" coils A, B, C, D, E as there are conductors, and every conductor is wound in every coil.

The number of turns of the several windings decrease from the center to the circumference of the coils, and, generally, this number is to be so determined as that the drop of potential in each winding shall be the same. This is illustrated by making, as already explained, the inner winding 1 of seven turns, with the turns of the other windings successively decreasing finally to three turns in the circumferential windings 5. By reason of this construction and because of the parallelism of the coils, there is no accumulation of potential between said coils. This permits of a much shorter device as a whole in order to withstand the applied potentials, obviates the use of insulating partitions between the coils, requires less copper, and involves less losses in attaining the same reactance value.

The coils A, B, C, D, E are separated by parallel wooden bars 6, 7, 8, 9 disposed in the intervening spaces, said bars projecting at each end beyond the circumference of the coils. Between the protruding ends of said bars are spacing blocks 10 which are curved to fit upon the coil peripheries. Rods 11—preferably covered with shellac—are received in registering openings in said bars and spacing blocks, as shown in Fig. 7.

The casing comprises two rectangular and parallel end walls 12, 13 of porcelain, between which are interposed two partitions 38, 39 of like material. The sets, X, Y, Z of coils are placed in the compartments between said partitions and said walls. The construction of the casing between wall 12 and partition 38, or between wall 13 and partition 39, or between partitions 38, 39, is the same, so that a description of said construction between wall 12 and partition 38 will apply to all. Between said wall and partition and at the upper corners of the same are interposed two series of porcelain blocks—one of said series being numbered 14, 15, 16, 17, 18, 19. The outer edges of said blocks register with the corresponding edges of said wall and partition. The inner corners of blocks 15, 16, 17, 18 are suitably formed to fit against the circumferential periphery of the coils. The blocks 14, 19 at the ends of the series at their inner corners have integral arms 20, 21, Fig. 5, which extend over the outer faces of coils A and E.

Between said wall and partition and at the lower corners of the same are interposed two series of porcelain blocks—one of said series being numbered 22, 23, 24, 25, 26, 27. The outer edges of said blocks register with corresponding edges of said wall and partition, and the inner corners of blocks 23, 24, 25, 26 are suitably formed to fit against the circumferential periphery of the coils. The blocks 22, 27 of both series at their inner corners have integral arms 29, 30, similar to arms 20, 21, which also extend over the outer faces of coils A and E, and between said faces and said wall and partition. Headed bolts 31, preferably inclosed in insulating tubes, extend through walls 12, 13, said partitions 38, 39 and said blocks, and clamp all parts together. The blocks may also be cemented together.

In the lower faces of the upper series of interposed blocks and in the upper faces of the lower series of interposed blocks on each side of the casing are grooves 32, into which may be slid panels 33, Fig. 1, for closing the rectangular space between said upper and lower blocks and said walls or partitions. In the opposite faces of the two series of interposed blocks above the coils are grooves which receive wooden bars 34, and in the opposite faces of the two series of interposed blocks below the coils are grooves which receive wooden bars 35. There are intervals between said bars to provide for the ventilation of the inclosed coils, due to the natural draft induced by the radiated heat from the windings.

The leads G I, G' I' and $G^2$ $I^2$ are inclosed in quadrangular bushes 36, 37 of insulating material. The inner wall of each bush is cut away to form a shoulder, which shoulders rest upon two of the bars 34. The leads G, G', $G^2$ extend through the channels between the three remaining bush walls; the leads I, I' $I^2$ do not, because the horizontal bent portion of each lead I, I', $I^2$ connects, as already explained, with windings 5, while the horizontal bent portion F of each lead G, G', $G^2$ connects with windings 1 of coils A, B, C, D, E.

The terminals G I, G' I', $G^2$ $I^2$ are to be connected respectively to different phases of the generator, as indicated symbolically at T, Fig. 4.

The three sets of coils X, Y, Z are respectively wound in the directions shown in Fig. 8: that is to say, the middle set Y is wound in the opposite direction to that of the two outer sets X, Z. With this connection, each of the outside sets has an additive mutual inductance or "boost" to the inner set, and the attractive stresses thereby produced under heavy currents between the outside sets and the inner set are in a compression direction. The two outside sets, however, will have a subtracting mutual inductance, (buck), and the stresses produced will be repulsion. As the distance between the outside sets is large, these stresses become comparatively small and the strains are taken care of by the heavy, preferably bronze, bolts 31.

The number of windings 1, 2, 3, 4, 5 on the two outside sets X, Z may be greater than that of the inner set Y—in which, for example, the outer winding 5 may be omitted—so as to give a completely balanced apparatus electrically, as the inner set has an additive mutual inductance with respect to each of the outer sets.

We claim:

1. A polyphase reactance apparatus, comprising a plurality of sets of parallel coils of the "pancake" type, said sets of coils being respectively connected in multiple with different phase currents.

2. A polyphase reactance apparatus, comprising a casing, transverse partitions of insulating material dividing said casing into three compartments, and three sets of parallel coils of the "pancake" type, said sets being respectively inclosed in said compartments, and said sets being respectively connected in multiple with different phase currents.

3. A polyphase reactance apparatus, comprising three sets of parallel coils of the "pancake" type, the direction of winding of the middle set of coils being opposite to that of the winding of the outer sets of coils, and the said sets of coils being respectively connected in multiple with different phase currents.

In testimony whereof we have affixed our signatures in presence of two witnesses.

PHILIP TORCHIO.
HARRY R. WOODROW.

Witnesses:
GERTRUDE T. PORTER,
MAY T. McGARRY.

Copies of this patent may be obtained for five cents each, by addressing the "Commissioner of Patents, Washington, D. C."